(12) United States Patent
Syeda-Mahmood

(10) Patent No.: US 6,507,838 B1
(45) Date of Patent: Jan. 14, 2003

(54) METHOD FOR COMBINING MULTI-MODAL QUERIES FOR SEARCH OF MULTIMEDIA DATA USING TIME OVERLAP OR CO-OCCURRENCE AND RELEVANCE SCORES

(75) Inventor: Tanveer Fathima Syeda-Mahmood, Cupertino, CA (US)

(73) Assignee: International Business Machines Corporation, Armonk, NY (US)

( * ) Notice: Subject to any disclaimer, the term of this patent is extended or adjusted under 35 U.S.C. 154(b) by 272 days.

(21) Appl. No.: 09/593,206

(22) Filed: Jun. 14, 2000

(51) Int. Cl.[7] ............................................. G06F 17/30

(52) U.S. Cl. .............................. 707/3; 707/6; 707/102

(58) Field of Search ................................ 707/3, 6, 102

(56) References Cited

U.S. PATENT DOCUMENTS

| | | | | |
|---|---|---|---|---|
| 5,644,686 A | * | 7/1997 | Hekmatpour | 706/45 |
| 5,802,361 A | * | 9/1998 | Wang et al. | 379/202.01 |
| 5,983,214 A | * | 11/1999 | Lang et al. | 707/1 |
| 6,029,195 A | * | 2/2000 | Herz | 707/10 |
| 6,243,724 B1 | * | 6/2001 | Mander et al. | 345/810 |
| 6,381,605 B1 | * | 4/2002 | Kothuri et al. | 707/100 |
| 6,389,168 B2 | * | 5/2002 | Altunbasak et al. | 345/723 |
| 6,404,925 B1 | * | 6/2002 | Foote et al. | 348/480 |

* cited by examiner

Primary Examiner—Wayne Amsbury
(74) Attorney, Agent, or Firm—McGinn & Gibb, PLLC; Daniel E. Johnson

(57) ABSTRACT

A method and structure for searching multi-media data having different modes using a query, includes processing the multi-media data to extract text and time reference points, identifying overlapping time periods when text in two or more of the modes corresponds to the query, and ranking a relevance of the overlapping time periods.

20 Claims, 3 Drawing Sheets

METHOD FOR COMBINING MULTI-MODAL QUERIES FOR SEARCH OF MULTIMEDIA DATA USING TIME OVERLAP OR CO-OCCURRENCE AND RELEVANCE SCORES

BACKGROUND OF THE INVENTION

1. Field of the Invention

The present invention generally relates to systems that search different modes of media (audio, text, etc.) based upon a query and more particularly to an improved system that ranks search results based upon a time overlap between the matches in different media modes.

2. Description of the Related Art

Information can be stored in many different forms (modes). Before the advent of audio recordings, the only form to record information was the written word (or written symbols) or numbers. Subsequently, audio and video recordings were used to supplement or replace written information. Regardless of the mode in which information is recorded, there is always a need to search the information so that only relevant portions need to be reviewed when the user has a question (query) on a very specific topic.

Conventional searches primarily involve key word queries of previously created text or textural summaries. Thus, it is common to perform a simple Boolean combination such as AND/OR, or perform a search based on individual relevance scores of the textural data. However, with the increasing use of different media modes to record information, there is a need to logically search video, audio, and graphics, as well as textual information. The invention described below provides a method and system in which different media modes are searched and their results combined to give a response to a query in a way that exploits the co-occurrence in time of the matches based on individual media modes.

SUMMARY OF THE INVENTION

It is, therefore, an object of the present invention to provide a structure and method for searching multi-media including audio, video, graphic display and written data using a query that comprises processing the individual media modes of the data against the query and retrieving candidate matches in the individual media modes that are marked with their relevance score and their time of occurrence in the media mode, identifying overlapping time periods in the individual media matches, combining their relevance scores and their noted overlap in time periods into a score for ranking the matches, and returning the higher overall score matches as overall candidate matches to the query.

This way of ranking takes into account errors in search of individual media modes by relying on an indication of a common location for a match using the individual media modal searches as seen through the evidence of a large amount of time overlap between the individual modal matches. The method admits any media mode in which an association of time to a match can be done. Thus if the data includes a video mode, and textual script mode, and is searched using a text query, it is assumed that the textual matches to the query can be assigned a time of occurrence with reference to the time of the video. Similarly, if the query requires a search of the audio mode of the data as queried through a text keyword, it is assumed that the heard matches to the queried textual keyword can be assigned a time of occurrence with reference to the time in the audio track.

A method of searching multi-media data having different modes using a query, the method including processing the multi-media data to extract relevance scores and time reference points of matches to individual media modes, identifying overlapping time periods when two or more of the modal matches correspond to the query, and ranking a relevance of the overlapping time periods. The ranking includes finding an overlapping time period having a highest relevance score, segmenting the overlapping time period to identify beginning and ending events, calculating a relevance distribution based on a frequency of occurrence of the query in a time period, and finding a largest number of different modes of overlap. The modes include two or more of audio, video, text, and graphic display. The query can have an input mode based on any of the modes and the method further includes outputting results of the query in a mode consistent with the input mode.

The method can also comprise searching multi-media including audio, video, graphic display and written data using a query, processing the multi-media data to extract relevance scores and time reference points, identifying portions of the matching media modes that correspond to the query, determining a relevance score for the matching mode, assigning time periods for the matching mode, identifying overlapping time periods, determining a relevance timing score of the overlapping time periods, and ranking the matching modes based on the relevance score and the relevance timing score.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF PREFERRED EMBODIMENTS OF THE INVENTION

The invention is directed toward combining searches using multi-modal queries on multi-media data. As discussed above, current methods of combining searches involve a simple Boolean combination such as AND/OR or operate based on the relevance scores of the individual modal matches. The invention goes well beyond conventional methods and takes into account an important aspect of multimedia content, namely, time co-occurrence of events. The manner in which the time co-occurrence of events is exploited along with the relevance scores of the individual modal matches is also an important feature of the invention.

Multimedia data such as learning material associated with an educational course can have multiple forms of data associated with it. Such data can be in the form of text derived from multiple sources, such as text books, scripts (for scripted presentations e.g., CEO communiques), text content within slides or overhead used during presentation, or speech converted to text from an analysis of the audio tract. Multimedia data also consists of audio information derived from the audio tract as well as visual information in the form of associated images. Finally, a video taping of the presentation/course can also be provided.

Figure 1:
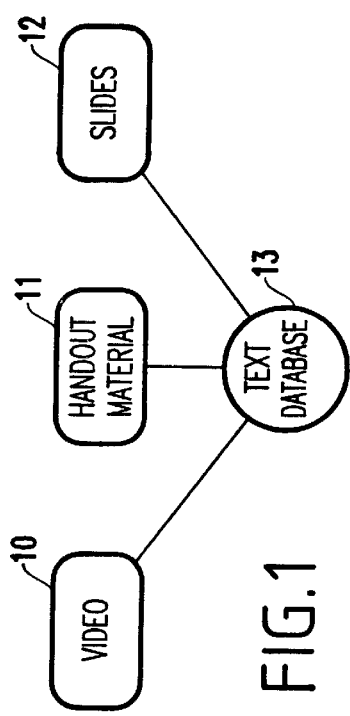
FIG. 1 is a schematic diagram of various multi-media sources connected to a data base.

Referring now to FIG. 1, a schematic diagram of different multi-media sources is illustrated. More specifically, FIG. 1 illustrates video 10, printed handout material 11, and graphical material, such as slides, 12. Each different multi-media source 10–12 is associated with one or more databases 13. Each of these media modes 10–12 can be used as cues to perform a search of the multimedia content. For example, the multimedia content can be searched for places in the data where the query keywords were "heard" in the audio tract of the video 10. Alternately, using a slide pattern as a query, the invention can locate places in the video 10 where the slide 12 was being depicted in the scene captured in the video.

Each of the searches based on individual cues can return multiple locations in the media as matches which could possibly overlap in time. Combining these matches to develop a coherent response to a user's high-level semantic query, is an important and challenging problem. Performing multiple-mode queries is a very valuable tool for searching and browsing videos. Previous work in this area has concentrated on combining matches generated from textual sources, with current search engines exploiting one or more of the combining methods for text search such as Boolean AND/OR etc.

The invention provides a generic combining process for multimedia data that incorporates both relevance scores and co-occurrence of time intervals and is a valuable addition to search engines. Such a combination (e.g. relevance scores and co-occurrence) point to relevant semantic events in a lecture or course such as identifying times when a certain topic was discussed. For example, it can be reasonably concluded that places in the video in which a speaker put up a slide representing the topic (seen, say, as a match for the slide pattern in the video tract) and also talked about it (heard, say, using words relating to the topic in the audio tract) are more relevant to a topic or a common thread of discussion than video segments, in which a topic was mentioned but not reinforced with a visual slide, or are more relevant than segments in which a slide was put up but never talked about.

Figure 2:
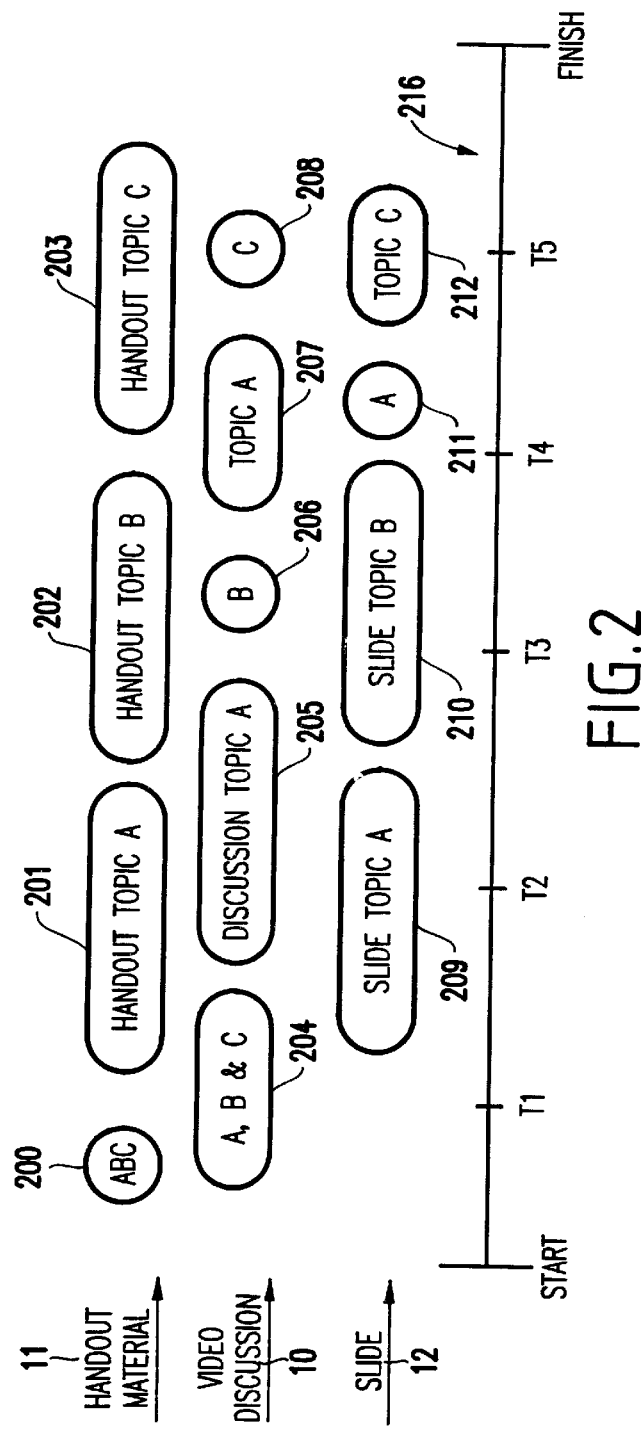
FIG. 2 is a schematic diagram of a time line illustrating the occurrence of different topics within the different media modes shown in FIG. 1.

FIG. 2 is a schematic diagram illustrating the topical content within different cues, such as the handout material 11, video 10, and slide 12 as they are used within a presentation made during a certain period of time covered by the time line 216. For example, the situation illustrated in FIG. 2 is a presentation where a speaker discussed topics A, B and C. The speaker was video recorded during the presentation. Further, the speaker presented three different slides 209, 210, 212, each relating to a different topic and the speaker handed out some material. This example is extremely simplified (when compared to the actual ability of the invention to perform a search) to aid in the reader's understanding of the basic operation of the invention.

During the presentation illustrated in FIG. 2, the handout material 11 briefly summarized topics A, B and C (200) and then thoroughly discussed topics A, B, and C, in order, in items 201–203. In one embodiment, the invention allocates the written handout material along the time line 216. The invention can assign the written text to various time periods (e.g., T1–T5) depending upon a logical nexus with the presentation. In the example shown in FIG. 2, the handout material is divided along the timeline 216 according to the approximate length of each section within the handout material. Therefore, as shown in FIG. 2, each topic 201–203 was approximately the same number of pages in length and was allocated an approximately equal time slot along time line 216. However, the invention is not limited to an approximation related to the length of the topic. Instead, the information from the video discussion 10 can be correlated such that the handout material 11 is allocated to time periods along the time line 216 which follow closely with the speaker's discussion.

In the illustration shown in FIG. 2, the audio portion of the discussion is converted to text (either manually or using a voice recognition software program). As shown in FIG. 2, at the beginning of the presentation, the speaker discussed an overview of all three topics A, B, and C in item 204. Toward the end of the overview of all the topics, the speaker presented a slide on topic A (209). The timing of when the Speaker presented the slides can be automatically or manually associated with a specific time period by viewing the video 10.

Toward the end of the discussion of topic A (205), the speaker removed the first slide and displayed a slide regarding topic B (210). The speaker's discussion with respect to topic B (206) was relatively short and the speaker returned to topic A (207) and even briefly redisplayed the slide relating to topic A (211). Then, the speaker concluded with a brief discussion of topic C (208) during which time the speaker displayed a slide of topic C (212).

Combining results of matches to multiple queries to generate an overall match is a challenging problem. Simple solutions such as ranking matches based on their individual cue scores are not sufficient as they cannot take into account the co-occurrence of matches, i.e., the fact that two or more of these matches occur in the same interval (e.g., 201, 205, 209). Not all ways of taking the match co-occurrence into account are helpful either. For example, assigning a fixed score to the fact that there is an overlap is not necessarily helpful since this would weigh heavily overlapping segments (e.g., 201, 209) the same as segments with small time overlap (e.g., 204, 209). Assigning a score to the extent of overlap and combining with the individual scores is also not enough since the duration over which such overlaps occur could potentially span the entire video returning the entire video as a match and causing a loss in precision.

The invention combines multi-modal searches of multimedia data by exploiting the time overlap or co-occurrence of event matches in addition to their relevance scores in a new way. Specifically, the invention proceeds by dividing the overlapping time intervals into groups and uses the relevance scores of individual matches within the groups and their extent of overlap to produce an overall score. Each match from an individual cue can be denoted by $\lfloor L_j(C_i), H_j(C_i), F_j(C_i) \rfloor$ where $\lfloor L_j, (C_i), H_j, (C_i) \rfloor$ are the lower and upper end points of the time interval of the jth match using the ith modal cue for query, and $\lfloor F_j, (C_i) \rfloor$ is the score of the jth match in the ith cue.

The invention forms a function of time given by $T(t) = \Sigma F_j(C_i) L_j(C_i) < t < H_j(C_i)$. This function is 0 at times where there are no matches due to any cue. This forms a cumulative distribution of the individual match scores along the time axis.

The invention then takes the derivative of the above functions; $\partial(t)/\partial t$. Then, the invention notes the time period or the cycle of the derivative by noting three consecutive zero crossings of the derivative curve (e.g., the beginning of the time period when the derivative bell-shaped curve goes from negative to positive, the maximum of the derivative curve where the curve changes from positive to negative, and the end of the time period when the derivative curve again changes from negative to positive). For the special cases where the profile of the cumulative distribution has less than three consecutive zero crossings, the time period between two consecutive zero crossings can be taken.

Figure 5:
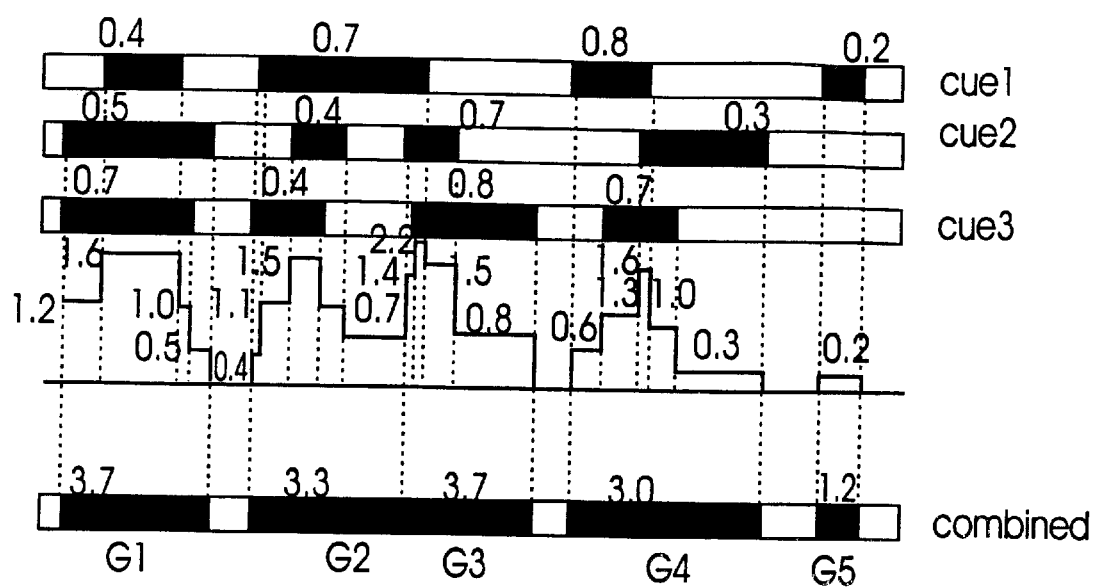
FIG. 5 is a timeline of cue events.

FIG. 5 shows such an example of a cumulative distribution formed from combining multi-modal searches. Here the individual scores of relevance of matches in individual cues are marked by the values on top of the bars. For example, one can see that there are 4 matches to the query using cue 1. Their time durations and locations are as marked by the dark rectangles with the lighter larger rectangle representing the entire time line of the data (e.g., total video duration). The cumulative distribution obtained by combining the relevance scores is shown in row 4 of FIG. 5. Notice the growing and shrinking of overlaps as seen by the rise and fall of the waveform.

The invention forms time interval groups between these triplets of adjacent zero crossings. The above process divides the time interval of matches into groups forming clusters that represent places where evidence for matches to one or more query types was found. The three consecutive zero crossings are based on the rationale that overlapping time intervals go through a pattern of overlapping cycles in which the overlap of interval grows and gradually shrinks. It can be seen in FIG. 5 that there are 5 distinct time interval groups that can be formed. Each such segment is assigned an overall score as follows for each match interval $[L_j(C_i)$, $H_j(C_i)$, $F_j(C_i)]$ belonging to group interval $G_k$, let $O_{jk}(C_i)$ be the fraction of overlap of the match interval with the group interval. Then the individual group score $F_k(G_k)$ is calculated as:

$$F_k(G_k) = \Sigma (F_j(C_i) + O_{jk}(C_i))$$

Lastly, the above scores are normalized to lie between 0 and 1 using the maximum value of $F_k(G_k)$ and are ranked in descending order to reflect the combined score. The last row in FIG. 5 illustrates the overall score assigned to the time interval groups using the above formula. It can then be inferred that the most relevant segments to the query are groups G1 and G3. Notice also, that these groups are not necessarily-those with the largest amount of overlap. Such an interval is designated by G4 which is not considered as significant since its constituent relevance scores of matches is lower in general to those in G1 and G3.

Thus, the invention groups the time intervals between three consecutive zero crossings, and combines individual scores as a linear combination of the individual scores with their overlaps to produce superior results when compared to conventional query programs. Finally, the notion of time co-occurrence of events combined with multiple match results produces unique advantages for the invention.

Existing methods of combining search results have been primarily targeted towards text searches of textual documents with Boolean and other relevance-scoping searches combinations now possible. The search of multimedia data based on visual, text and audio query types and their combination of results that take into account their time co-occurrence have not been considered conventionally.

Referring again to FIG. 2, the invention determines relevant scores for the information within the database 13 that is retrieved from the video 10, handout material 11, and slides 12. Further, the invention includes information regarding the time periods in which the query match was encountered. Therefore, if a very simplified search was made for "topic A" in the examples shown in FIG. 2, the text database 13 would include information from the handout 201, the text from the audio portion of the video recording 205, 207 and the slide of topic A at 209, 211.

Therefore, as shown above, the invention utilizes more than a search of the text within the data base 13. The invention increases the accuracy of the search results by determining the time period when the various modes of the multi-media sources were being utilized simultaneously to explain a given idea or subject. The invention realizes that the most relevant portion of the presentation for a given topic would, most likely, be at the point during the presentation when all resources were focused on that given topic. Therefore, the invention utilizes the timing as well as the topical relevance to increase the accuracy of the search results.

In addition, the invention can output the search results in the same mode as the source of the query. Therefore, the invention can output the search results as text, as a portion of the video recording, or as a slide.

Figure 3:
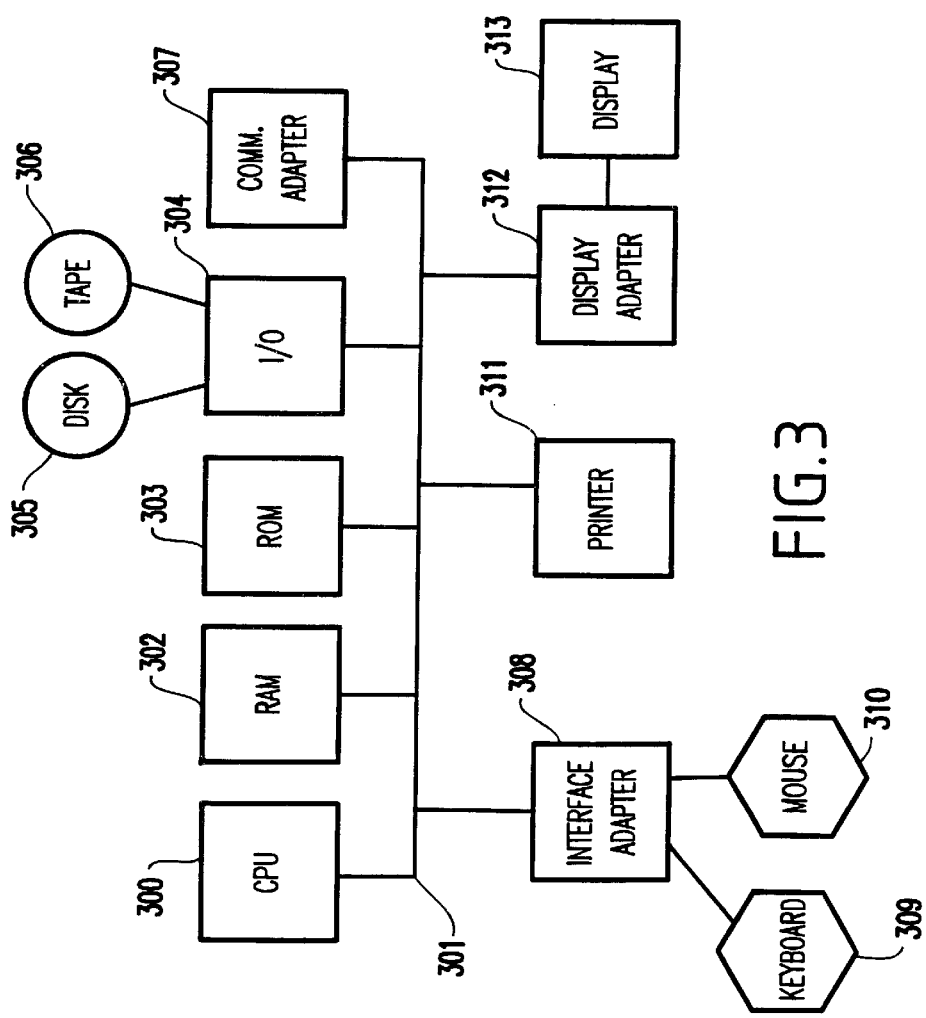
FIG. 3 is a schematic diagram of a hardware embodiment of the invention.

While the overall methodology of the invention is described above, the invention can be embodied in any number of different types of systems and executed in any number of different ways, as would be known by one ordinarily skilled in the art. For example, as illustrated in FIG. 3, a typical hardware configuration of an information handling/computer system in accordance with the invention preferably has at least one processor or central processing unit (CPU) 300. For example, the central processing unit 300 could include various image/texture processing units, mapping units, weighting units, classification units, clustering units, filters, adders, subtractors, comparators, etc. Alternatively, as would be known by one ordinarily skilled in the art given this disclosure, multiple specialized CPUs (or other similar individual functional units) could perform the same processing, mapping, weighting, classifying, clustering, filtering, adding, subtracting, comparing, etc.

The CPU 300 is interconnected via a system bus 301 to a random access memory (RAM) 302, read-only memory (ROM) 303, input/output (I/O) adapter 304 (for connecting peripheral devices such as disk units 305 and tape drives 306 to the bus 301), communication adapter 307 (for connecting an information handling system to a data processing network) user interface adapter 308 (for connecting a peripherals 309–310 such as a keyboard, mouse, imager, microphone, speaker and/or other interface device to the bus 301), a printer 311, and display adapter 312 (for connecting the bus 301 to a display device 313). The invention could be implemented using the structure shown in FIG. 3 by including the inventive method, described above, within a computer program stored on the storage device 305. Such a computer program would act on multi-media information and queries supplied through the interface units 309–310 or through the network connection 307. The system would then automatically perform a search and output the results on the display 313, through the printer 311 or back to the network 307.

Figure 4:
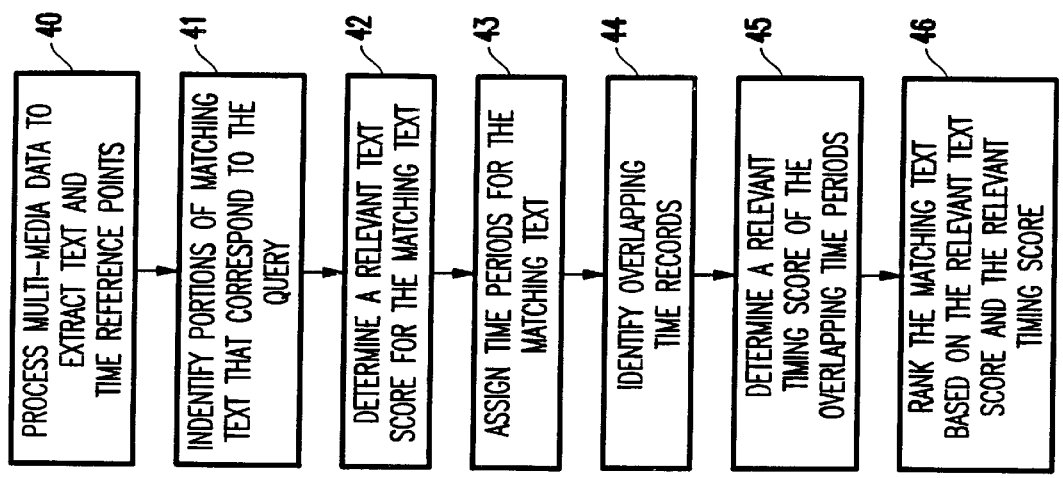
FIG. 4 is a flowchart embodiment of the invention.

FIG. 4 is a flowchart illustrating the inventive method for searching multi-media including audio, video, graphic display, and written data using a query. Item 40 illustrates processing the multi-media data to extract textual, audio and video representations. Item 41 illustrates the various query modes such as text and image that can be used to search the multimedia data. The text query can be used to search the text data to extract relevant matches and their time reference points. In addition, the text query can be used to search the text-converted audio data to extract relevant matches in the audio tract and their time reference points (item 42). Finally, the image query can be used to find visual matches to the query in the video tract and relevant matches are returned along with their time reference points.

Depending on the visual query, a number of different schemes of object detection and recognition in the video are admitted under this embodiment (item 43). The time reference points of all the matches are combined into a common time line and their cumulative distribution is derived as explained earlier (item 44). This distribution is segmented into groups of time overlaps as also explained earlier (item 45). The relevance scores of the individual time groups are computed as a linear combination of the fraction of overlap and the individual relevance matches of the cues (item 46). These groups are then ranked to list the most relevant matches to a query based on multimodal search and its combination (item 47).

By taking into account the time co-occurrence of matches in addition to their individual relevance scores, this methods provides a higher degree of robustness to errors in search in the individual media modes. As is conventionally believed, visual and audio searches are notoriously lacking in precision. In such cases, the combining of evidence can tremendously enhance the robustness of a search engine.

While the invention has been described in terms of preferred embodiments, those skilled in the art will recognize that the invention can be practiced with modification within the spirit and scope of the appended claims.

What is claimed is:

1. A method of searching multi-media data having different modes using a query, said method comprising:

processing said multi-media data to extract relevance scores and time reference points of matches to individual media modes;

identifying overlapping time periods when two or more of said modal matches correspond to said query; and ranking a relevance of said overlapping time periods.

2. The method in claim 1, wherein said ranking includes finding an overlapping time period having a highest relevance score.

3. The method in claim 1, wherein said ranking includes segmenting said overlapping time period to identify beginning and ending events.

4. The method in claim 3, wherein said ranking includes calculating a relevance distribution based on a frequency of occurrence of said query in a time period.

5. The method in claim 1, wherein said ranking includes finding a largest number of different modes of overlap.

6. The method in claim 1, wherein said modes comprise two or more of audio, video, text, and graphic display.

7. The method in claim 1, wherein said query can have an input mode based on any of said modes and said method further comprises outputting results of said query in a mode consistent with said input mode.

8. A method of searching multi-media including audio, video, graphic display and written data using a query, said method comprising:

processing said multi-media data to extract relevance scores and time reference points;

identifying portions of said matching media modes that correspond to said query;

determining a relevance score for said matching mode;

assigning time periods for said matching mode;

identifying overlapping time periods;

determining a relevance timing score of said overlapping time periods; and ranking said matching modes based on said relevance score and said relevance timing score.

9. The method in claim 8, wherein said ranking includes finding an overlapping time period having a highest relevance score.

10. The method in claim 8, wherein said relevance score comprises a relevance distribution based on a frequency of occurrence of said query in a time period.

11. The method in claim 8, wherein said ranking includes finding a largest number of different modes of overlap.

12. The method in claim 11, wherein said modes comprise two or more of said audio, video, graphic display, and written data.

13. The method in claim 8, wherein said query can have an input mode based on any of said modes and said method further comprises outputting results of said query in a mode consistent with said input mode.

14. A program storage device readable by machine, tangibly embodying a program of instructions executable by the machine to perform method steps for searching multi-media data having different modes using a query, said method comprising:

processing said multi-media data to extract scores and time reference points;

identifying overlapping time periods when matches in two or more of said modes correspond to said query; and ranking a relevance of said overlapping time periods.

15. The program storage device in claim 14, wherein said ranking includes finding an overlapping time period having a highest relevance score.

16. The program storage device in claim 14, wherein said ranking includes developing a relevance score of said modal data matching said query.

17. The program storage device in claim 16, wherein said ranking includes calculating a relevance distribution based on a frequency of occurrence of said query in a time period.

18. The program storage device in claim 14, wherein said ranking includes finding a largest number of different modes of overlap.

19. The program storage device in claim 14, wherein said modes comprise two or more of audio, video, text, and graphic display.

20. The program storage device in claim 14, wherein said query can have an input mode based on any of said modes and said method further comprises outputting results of said query in a mode consistent with said input mode.

* * * * *